US012623209B2

(12) United States Patent
Seong et al.

(10) Patent No.: US 12,623,209 B2
(45) Date of Patent: May 12, 2026

(54) PHOSPHOR-TRANSITION METAL-PHOTOCATALYST HYBRID COMPOSITE MATERIAL, METHOD FOR PREPARING THE SAME, AND FILTER USING THE SAME

(71) Applicants: HYUNDAI MOTOR COMPANY, Seoul (KR); KIA CORPORATION, Seoul (KR); UNIVERSITY OF SEOUL INDUSTRY COOPERATION FOUNDATION, Seoul (KR)

(72) Inventors: Kwang Mo Seong, Bucheon-si (KR); Jung Sik Kim, Seoul (KR)

(73) Assignees: HYUNDAI MOTOR COMPANY, Seoul (KR); KIA CORPORATION, Seoul (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 518 days.

(21) Appl. No.: 18/115,196

(22) Filed: Feb. 28, 2023

(65) Prior Publication Data

US 2024/0116030 A1 Apr. 11, 2024

(30) Foreign Application Priority Data

Sep. 29, 2022 (KR) ........................ 10-2022-0123913

(51) Int. Cl.
B01J 21/06 (2006.01)
B01D 53/88 (2006.01)
(Continued)

(52) U.S. Cl.
CPC .......... B01J 21/063 (2013.01); B01D 53/885 (2013.01); B01J 21/08 (2013.01); B01J 23/04 (2013.01);
(Continued)

(58) Field of Classification Search
CPC . B01J 21/063; B01J 21/08; B01J 23/04; B01J 23/10; B01J 23/72; B01J 29/072;
(Continued)

(56) References Cited

U.S. PATENT DOCUMENTS 8,207,085 B2    6/2012   Kuroda et al.
2023/0201802 A1*  6/2023   Kim ..................... B01D 53/885
                                          502/1

FOREIGN PATENT DOCUMENTS

CN           1490079 A      4/2004
JP        2015-150476 A      8/2015
               (Continued)

OTHER PUBLICATIONS

English machine translation of KR20200061826A (Year: 2020).*
(Continued)

*Primary Examiner* — Anthony J Zimmer
*Assistant Examiner* — Abdul-Rahman Yusuf Waleed Smari
(74) *Attorney, Agent, or Firm* — MCDONNELL BOEHNEN HULBERT & BERGHOFF LLP

(57) ABSTRACT

A phosphor-transition metal-photocatalyst hybrid composite material includes a plurality of beads including a phosphor material, a binder, and zeolite, a plurality of transition metal particles supported on the surface of each of the plurality of beads, and a photocatalyst layer formed on the surface of each of the plurality of beads supporting the transition metal particles by coating a photocatalyst material.

7 Claims, 15 Drawing Sheets

(51) Int. Cl.

| | |
|---|---|
| *B01J 21/08* | (2006.01) |
| *B01J 23/04* | (2006.01) |
| *B01J 23/10* | (2006.01) |
| *B01J 23/72* | (2006.01) |
| *B01J 29/072* | (2006.01) |
| *B01J 35/39* | (2024.01) |
| *B01J 37/00* | (2006.01) |
| *B01J 37/02* | (2006.01) |
| *B01J 37/03* | (2006.01) |
| *B01J 37/08* | (2006.01) |
| *C09K 11/77* | (2006.01) |

(52) U.S. Cl.

CPC ............... *B01J 23/10* (2013.01); *B01J 23/72* (2013.01); *B01J 29/072* (2013.01); *B01J 35/39* (2024.01); *B01J 37/0018* (2013.01); *B01J 37/0219* (2013.01); *B01J 37/0221* (2013.01); *B01J 37/0228* (2013.01); *B01J 37/0236* (2013.01); *B01J 37/0244* (2013.01); *B01J 37/038* (2013.01); *B01J 37/088* (2013.01); *C09K 11/7792* (2013.01); *B01D 2255/206* (2013.01); *B01D 2255/20707* (2013.01); *B01D 2255/20761* (2013.01); *B01D 2255/30* (2013.01); *B01D 2255/50* (2013.01); *B01D 2255/802* (2013.01); *B01D 2255/9025* (2013.01)

(58) Field of Classification Search

CPC .... B01J 35/39; B01J 37/0018; B01J 37/0219; B01J 37/0221; B01J 37/0228; B01J 37/0236; B01J 37/0244; B01J 37/038; B01J 37/088; B01J 23/78; B01J 29/04; B01J 37/0201; B01J 37/0207; B01J 37/036; B01J 21/06; B01J 27/24; B01J 29/7049; B01J 29/74; B01J 29/76; B01J 29/78; B01J 37/0009; B01J 37/024; B01J 37/08; B01J 37/343; B01D 53/885; B01D 2255/206; B01D 2255/20707; B01D 2255/20761; B01D 2255/30; B01D 2255/50; B01D 2255/802; B01D 2255/9025; B01D 39/2062; C09K 11/7792

See application file for complete search history.

(56) References Cited

FOREIGN PATENT DOCUMENTS

| | | | | |
|---|---|---|---|---|
| KR | 10-0965105 | B1 | 6/2010 | |
| KR | 2017-0026966 | A | 3/2017 | |
| KR | 2020-0061826 | A | 6/2020 | |
| KR | 2022-0034951 | A | 3/2022 | |
| WO | WO-2022055013 | A1 * | 3/2022 | .......... B01J 37/0009 |

OTHER PUBLICATIONS

Yu et al., "Photocatalytic reaction of composite of TiO2 hydrothermally coated on (Cu-doped Sr4Al14O25:Eu2+,Dy3+) phosphor" Applied Nanoscience 12, May 2022, 3373-3385 (Year: 2022).*

Eun et al., "Preparation of Ag—TiO2/Sr4Al14O25:Eu2+,Dy3+ Photocatalyst on Phosphor Beads and Its Photoreaction Characteristics" Catalysts 11, Feb. 2021, 1-13 (Year: 2021).*

Mavengere et al., "Photocatalytic Properties of g-C3N4—Supported on the SrAl2O4:Eu,Dy/SiO2" Coatings 10, Sep. 2020, 1-17 (Year: 2020).*

* cited by examiner

PHOSPHOR-TRANSITION METAL-PHOTOCATALYST HYBRID COMPOSITE MATERIAL, METHOD FOR PREPARING THE SAME, AND FILTER USING THE SAME

CROSS REFERENCE TO RELATED APPLICATIONS

This application claims the benefit of Korean Patent Application No. 10-2022-0123913, filed on Sep. 29, 2022 in the Korean Intellectual Property Office, the disclosure of which is incorporated herein by reference.

BACKGROUND

1. Field

The present disclosure relates to a phosphor-transition metal-photocatalyst hybrid composite material, a method for preparing the phosphor-transition metal-photocatalyst hybrid composite material, and a filter including the phosphor-transition metal-photocatalyst hybrid composite material.

2. Discussion of the Background

As air pollution caused by yellow dust and the like has recently become more serious, demand for air purification systems (e.g., air purifiers and air purifying devices) to improve the quality of indoor air is gradually increasing. Accordingly, various studies have been extensively conducted on methods for effectively purifying indoor air contaminated by a variety of air pollutants, exhaust gas of automobiles, volatile organic compounds (VOCs), harmful gases, odors, and viruses. Among these studies, a technique of purifying air using a photocatalyst with strong photolysis has drawn considerable attention.

Titanium dioxide ($TiO_2$), known as a representative photocatalyst material, generates radicals with strong oxidizing power when exposed to ultraviolet light, and the radicals decompose various environmental pollutants present in water or air into harmless carbon dioxide, water, etc. In addition, very high chemical stability of titanium dioxide without being changed even after exposed to light enables use of titanium dioxide semi-permanently.

Meanwhile, reactive oxygen ($O_2^{\cdot-}$) or hydroxyl radical ($\cdot OH$) generated by photolysis has higher oxidizing power than conventional chlorine ($Cl_2$) or ozone ($O_3$) to have superior sterilization of harmful viruses and bacteria and deodorization.

However, although titanium dioxide is a superior photocatalyst as a single-component material, photolysis occurs only upon absorbing high-energy ultraviolet light (UV, $\lambda \leq 390$ nm) due to a large band gap (for example, band gap of anatase phase: 3.2 eV). Thus, in the case where titanium dioxide is irradiated with sunlight, only a small amount of UV light of about 3 to 4% contained in sunlight may be absorbed by titanium dioxide.

In addition, because titanium dioxide is photo-activated only in the form of nano-sized particles, there are many limits to directly apply nano-sized particles to devices for reducing air pollutants. Therefore, in order to efficiently use photocatalyst materials in air purification systems, it is necessary to develop a support capable of effectively fixing the photocatalyst materials and a method of precisely coating the photocatalyst material capable of maximizing photoactive reaction.

SUMMARY

Provided are a method for manufacturing granular beads by using a phosphor, which is a light-emitting material, as a support effectively supporting a nano-sized photocatalyst material and a method for preparing phosphor-photocatalyst beads having high photolysis performance of various harmful materials by coating the surfaces of the beads with a photocatalyst material and supporting a transition metal element on the surfaces of the beads. The transition metal-supporting phosphor-photocatalyst beads prepared according to the present disclosure is a composite photocatalyst material including titanium dioxide as a photocatalyst material, Cu as a transition metal element, and a phosphor as a light-emitting material, and photo-activation easily occurs not only by ultraviolet light but also visible light. Also, because the support fixing the photocatalyst material is manufactured in the form of granular beads, the composite material is very easily mounted on a filter of various types of commercially available air purification devices.

In addition, a filter using the phosphor-transition metal-photocatalyst hybrid composite material of the present disclosure may be easily applied to air purification systems used to remove various air contaminants (e.g., harmful gases, volatile organic compounds (VOCs), viruses, and odors) by photolysis not only in an indoor space with a lighting system but also in a dark space without light, and mass production thereof is possible.

However, the technical problems to be solved by the present disclosure are not limited to the aforementioned problems, and any other technical problems not mentioned herein will be clearly understood from the following description by those skilled in the art to which the present disclosure pertains.

In accordance with an aspect of the present disclosure to solve the above-described problems, a phosphor-transition metal-photocatalyst hybrid composite material includes: a plurality of beads including a phosphor material, a binder, and zeolite; a plurality of transition metal particles supported on the surface of each of the plurality of beads; and a photocatalyst layer formed on the surface of each of the plurality of beads supporting the plurality of transition metal particles by coating a photocatalyst material.

In addition, the phosphor material may include at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O compound-based materials.

In addition, the binder may include at least one selected from sodium silicate ($Na_2SiO_3$), sodium polyphosphate ($NaPO_3)_n$, liquid silica, and glaze.

In addition, the plurality of transition metal particles may include particles of at least one selected from Cr, Mn, Fe, Co, Ni, Cu, Zn, Zr, Ru, Rh, Pd, Ag, Ta, W, Pt, and Au.

In addition, the photocatalyst material may include titanium dioxide ($TiO_2$), graphitic carbon nitride ($g$-$C_3N_4$), or a material formed of a combination thereof.

In addition, the photocatalyst layer may further include $SiO_2$.

In accordance with another aspect of the present disclosure to solve the above-described problems, a method for preparing a phosphor-transition metal-photocatalyst hybrid composite material includes the steps of (A) preparing a plurality of phosphor beads, (B) allowing a plurality of transition metal particles to be supported on the surface of each of the a plurality of phosphor beads, and (C) coating a photocatalyst on the surface of each of the a plurality of transition metal-supporting phosphor beads to form a photocatalyst layer.

In addition, step (A) may include preparing a phosphor slurry by mixing phosphor powder, a binder, zeolite, and distilled water, preparing a plurality of semi-solid phosphor beads by injecting the phosphor slurry into a mold for manufacturing beads, followed by demolding, and preparing the plurality of phosphor beads by drying and heat-treating the plurality of semi-solid phosphor beads.

In addition, the phosphor powder may include at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O compound-based materials.

In addition, the binder may include at least one selected from sodium silicate ($Na_2SiO_3$), sodium polyphosphate ($NaPO_3)_n$, liquid silica, and glaze.

In addition, step (B) may include preparing a transition metal support solution by dissolving a transition metal salt in alcohol, adding the plurality of phosphor beads to the transition metal support solution, followed by sonication and filtration, and obtaining a plurality of transition metal-supporting phosphor beads by drying and heat-treating the plurality of filtered phosphor beads.

In addition, the transition metal salt may include copper (II) nitrate trihydrate [$Cu(NO_3)_2 \cdot 3H_2O$] or copper (II) sulfate pentahydrate ($CuSO_4 \cdot 5H_2O$).

In addition, a concentration of the transition metal support solution may be from 0.600 to 0.170 M.

In addition, step (C) may be performed by applying at least one of a sol-gel method, hydrothermal synthesis, and chemical vapor deposition (CVD).

In addition, step (C) may include preparing a photocatalyst sol by mixing a photocatalyst precursor, an alcohol-based solution, and an acid, coating the photocatalyst on the surfaces of the plurality of transition metal-supporting phosphor beads by hydrothermal synthesis using the plurality of transition metal-supporting phosphor beads and the photocatalyst sol, and heat-treating the plurality of transition metal-supporting phosphor beads coated with the photocatalyst.

In addition, the photocatalyst precursor may include at least one selected from titanium tetra-isopropoxide [$Ti(OCH(CH_3)_2)_4$], tetrabutyl titanate [$Ti(C_4H_9O)_4$], and tetraethoxytitanium [$Ti(OCH_2CH_3)_4$].

In addition, the photocatalyst sol may further include a tetraethyl orthosilicate solution.

In accordance with another aspect of the present disclosure to solve the above-described problems, a filter includes an air-permeable body frame, and the phosphor-transition metal-photocatalyst hybrid composite material.

According to the present disclosure, the phosphor-transition metal-photocatalyst hybrid composite material of the present disclosure, in the form of small granular beads, may be easily applied to air purification systems such as common air purifiers, and may have improved mechanical strength and durability of phosphor beads by adding a binder and zeolite during a bead-manufacturing process. Also, beads of the same standardized size may be mass-produced by using a mold.

When the phosphor-transition metal-photocatalyst hybrid composite material is prepared by coating the photocatalyst material such as titanium dioxide ($TiO_2$) on the phosphor beads by hydrothermal reaction, particles of the photocatalyst are densely adsorbed onto the surface of the support with high adhesion, thereby improving durability of the photocatalyst layer.

Because the phosphor-transition metal-photocatalyst hybrid composite material of the present disclosure has very high photolysis efficiency not only by UV light but also visible light and not only light arriving at the photocatalyst layer from the outside but also light emitted from the phosphor support may serve as a light source inducing photo-activation of the photocatalyst on the surface, photolysis of the photocatalyst coating layer is promoted to obtain superior photolysis performance to conventional photocatalyst materials.

The phosphor-transition metal-photocatalyst hybrid composite material of the present disclosure, which is a composite material in which a self-emissive phosphor material is hybridized with a photocatalyst, have characteristics of prolonged photolysis for a certain period of time by self-emission of the phosphor even after light exposure is stopped because the photocatalyst is photo-activated by light emitted from the phosphor.

However, the effects obtainable by the present disclosure are not limited to the aforementioned effects, and any other effects not mentioned herein will be clearly understood from the following description by those skilled in the art to which the present disclosure pertains.

DETAILED DESCRIPTION

Figure 1:
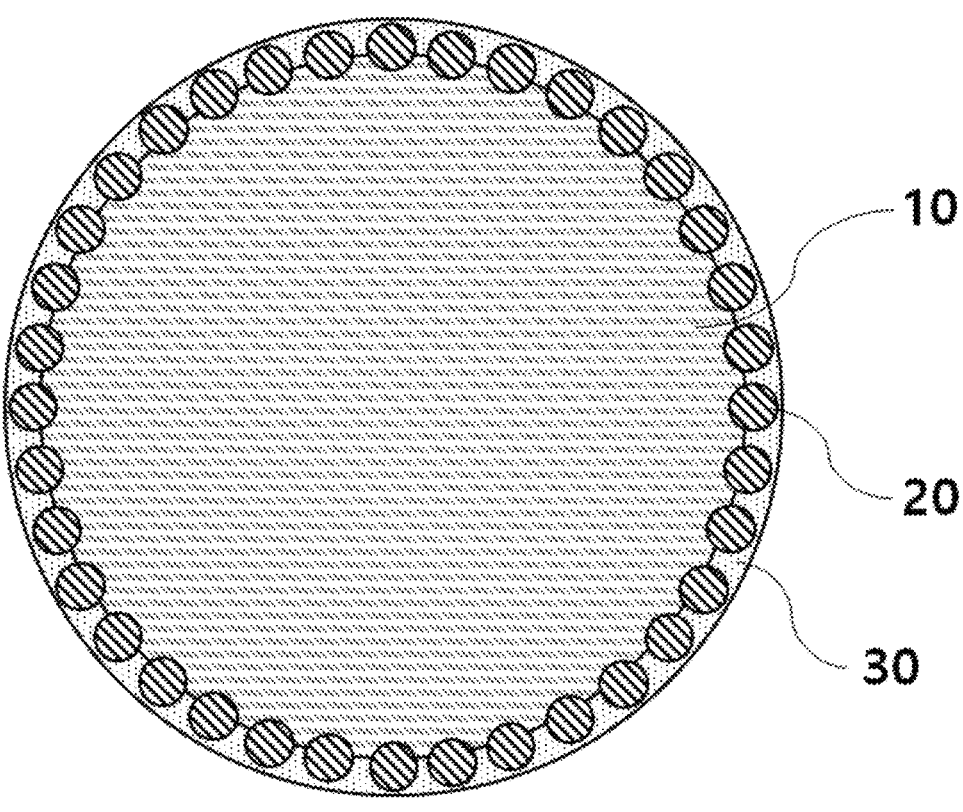
FIG. 1 is a cross-sectional view illustrating a structure of a phosphor-transition metal-photocatalyst hybrid composite material according to an embodiment of the present disclosure.

Hereinafter, preferred embodiments of the present disclosure will now be described. However, the present disclosure may be embodied in many different forms and should not be construed as being limited to the embodiments set forth herein. Rather, these embodiments are provided so that this disclosure will be thorough and complete, and will fully convey the scope of the disclosure to those skilled in the art.

The terms used herein are merely used to describe particular embodiments. Thus, an expression used in the singular encompasses the expression of the plural, unless it has a clearly different meaning in the context. In addition, it is to be understood that the terms such as "including" or "having" are intended to indicate the existence of features, steps, functions, components, or combinations thereof disclosed in the specification, and are not intended to preclude the possibility that one or more other features, steps, functions, components, or combinations thereof may exist or may be added.

Meanwhile, unless otherwise defined, all terms used herein have the same meaning as those commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

In addition, the terms "about", "substantially", etc. used throughout the specification mean that when a natural manufacturing and substance allowable error are suggested, such an allowable error corresponds a value or is similar to the value, and such values are intended for the sake of clear understanding of the present disclosure or to prevent an unconscious infringer from illegally using the disclosure of the present disclosure.

Titanium dioxide, which has conventionally been used the most as a photocatalyst, is a superior photocatalyst as a single-component material. However, due to a large band gap (for example, band gap of anatase phase: 3.2 eV), photolysis occurs only upon absorbing high-energy ultraviolet light (UV, $\lambda \leq 390$ nm). Thus, when titanium dioxide is irradiated with sunlight, only a small amount of UV light of about 3 to 4% contained in sunlight is absorbed by titanium dioxide and contributes to photolysis, and thus there is a limit to increase photocatalytic efficiency. In addition, titanium dioxide is photo-activated only in the form of nano-sized particles, there are many limits to directly apply nano powder to devices for reducing air pollutants. Therefore, there is a need to develop a support effectively fixing a photocatalyst material in order to efficiently use the photocatalyst material in air purification systems.

The present disclosure provides a method for preparing a phosphor-transition metal-photocatalyst hybrid composite material by manufacturing granular beads using a phosphor, which is a light-emitting material, as a support strongly fixing a nano-sized titanium dioxide photocatalyst material, and coating the surfaces of the beads with a photocatalyst material and supporting a transition metal element on the surfaces, so that photolysis efficiency of the photocatalyst material is significantly increased and photo-activation occurs not only by UV light but also by visible light. The phosphor-transition metal-photocatalyst hybrid composite material is a composite material including a photocatalyst material such as titanium dioxide, a transition metal element such as Cu, and a light-emitting material such as a phosphor, and photo-activation thereof vigorously occurs by a visible light source as well as a UV light source. Also, the phosphor-transition metal-photocatalyst hybrid composite material of the present disclosure may have an effect on promoting photolysis even in a dark environment by light emitted from the phosphor material. Because the phosphor support that fixes the photocatalyst material according to the present disclosure is manufactured in the form of granular beads, the phosphor support is easily applied to various types of common air purification systems as a filter. In addition, the phosphor beads are manufactured using a mold, mass production thereof may be possible in a certain size.

FIG. 1 is a cross-sectional view illustrating a structure of a phosphor-transition metal-photocatalyst hybrid composite material according to an embodiment of the present disclosure.

The phosphor-transition metal-photocatalyst hybrid composite material according to an aspect of the present disclosure includes a plurality of beads 10 including a phosphor material, a binder, and zeolite; a plurality of transition metal particles 20 supported on the surface of each of the plurality of beads; and a photocatalyst layer 30 formed on the surface of each of the plurality of beads supporting the plurality of transition metal particles by coating a photocatalyst material.

The phosphor bead 10 enables photolysis even in a dark environment without light and serves as a support to effectively fix a nano-sized photocatalyst material. Specifically, the phosphor beads 10 may be formed in a small granular shape having a diameter of about 1 to 8 mm by adding the binder and zeolite to phosphor powder. When this size range is satisfied, the highest photolysis efficiency may be obtained.

The phosphor material is a light-emitting material in the form of powder having high luminance and long-lasting characteristics, and any material emitting light by absorbing light may be used without limitation. For example, the phosphor material may include at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, (Sr, Ba)$_2MgSi_2O_7$:(Eu,Dy)-based, $Ba_4(Si_3O_8)_2$:(Eu,Dy)-based, and [Ca,Sr,Ba]—Al—O compound-based materials. More specifically, the phosphor material may include $CaAl_2O_4$: $(Eu^{2+}, Nd^{3+})$ emitting blue fluorescence, $SrAl_2O_4$:$(Eu^{2+}, Nd^{3+})$ emitting green fluorescence, $BaAl_2O_4$:$(Eu^{2+}, Nd^{3+})$ emitting blue fluorescence, $Sr_4Al_{14}O_{25}$:$(Eu^{2+}, Nd^{3+})$ emitting bluish green fluorescence, or the like.

The binder may include at least one inorganic material selected from sodium silicate ($Na_2SiO_3$), sodium polyphosphate ($NaPO_3$)$_n$, liquid silica, and glaze, and the zeolite may be a powder raw material represented by a chemical formula $(W_mZ_nO_2)_n \cdot nH_2O$ (wherein W is Na, Ca, Ba or Sr, and Z=Si+Al).

In the phosphor-transition metal-photocatalyst hybrid composite material of the present disclosure, the transition metal capable of lowering photo-activation energy of the photocatalyst may be supported on the surface of the phosphor bead 10. The transition metal binds to the photocatalyst material to lower photo-activation energy of the photocatalyst material, thereby easily generating reactive radicals by visible light as well as UV light.

The transition metal particles 20 are used to improve photolysis performance by lowering the photo-activation energy of the photocatalyst, and may include, for example, at least one selected from the group consisting of Cr, Mn, Fe, Co, Ni, Cu, Zn, Zr, Ru, Rh, Pd, Ag, Ta, W, Pt, and Au, preferably Cu.

In the phosphor-transition metal-photocatalyst hybrid composite material of the present disclosure, the photocatalyst layer 30 is formed on the phosphor bead 10 on which the transition metal is supported, and the photocatalyst layer 30 may be formed of a photocatalyst in the form of a plurality of nanoparticles.

The photocatalyst material may include titanium dioxide ($TiO_2$), graphitic carbon nitride (g-$C_3N_4$), or a hybrid material thereof [g-$C_3N_4$/$TiO_2$:(Fe, Cu, Co, Ni, and N)] which have characteristics of inducing photo-activation upon absorbing light such as sunlight resulting in photolysis of various organic materials or harmful gases. For example, in the case using titanium dioxide, the photocatalyst material may be crystalized in an anatase phase.

The photocatalyst layer 30 may further include $SiO_2$ to increase adhesive strength between the phosphor bead 10 supporting the transition metal 20 and the photocatalyst layer 30. By increasing adhesive strength between the phosphor bead supporting the transition metal and the photocatalyst layer, the photolysis efficiency may further be increased.

Figure 3A:
FIG. 3A is a photograph of a phosphor-transition metal-photocatalyst hybrid composite material in a bright-field.
Figure 3B:
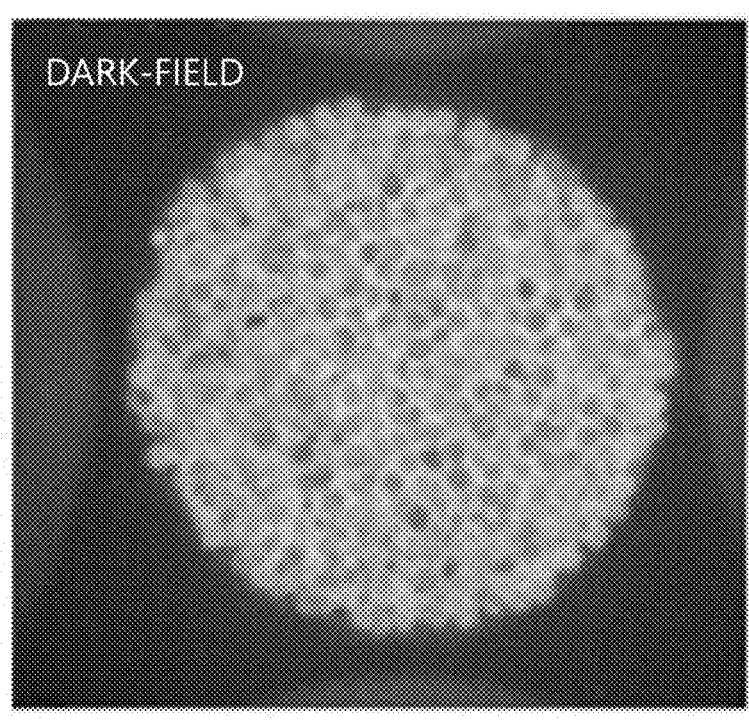
FIG. 3B is a photograph of a phosphor-transition metal-photocatalyst hybrid composite material in a dark-field.

FIGS. 3A and 3B are photographs of a phosphor-transition metal-photocatalyst hybrid composite material of the present disclosure (in a bright environment and a dark environment).

The photocatalyst material on the surface of the phosphor-transition metal-photocatalyst hybrid composite material is photo-activated by UV light or visible light received from the outside to generate highly reactive radicals (e.g., hydroxyl ions and reactive oxygen species) capable of decomposing pollutants in the air such as harmful gases and organic materials.

Meanwhile, the photocatalyst material, as one of the components constituting the phosphor-transition metal-photocatalyst hybrid composite material, is excited by external light such as sunlight and emits light in response to de-excitation, and the photocatalyst material disposed on the surface thereof is photo-activated by the light.

In addition, the transition metal supported on the surface of the phosphor bead binds to the photocatalyst material to lower photo-activation energy of the photocatalyst material, thereby easily generating reactive radicals. Additional photolysis of the contaminant may occur during this process, and the phosphor-transition metal-photocatalyst hybrid composite material according to an embodiment of the present disclosure may have a considerably increased efficiency compared to the conventional photocatalyst materials (e.g., titanium dioxide and graphitic carbon nitride) by the additional photolysis.

Figure 2:
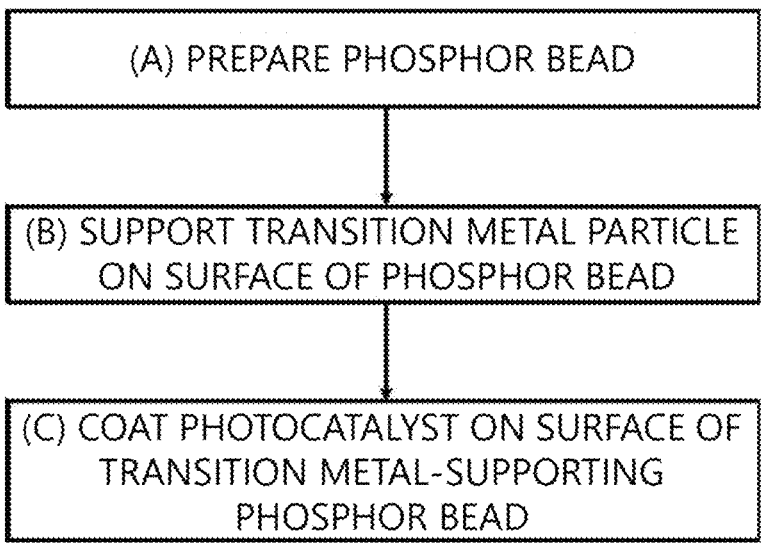
FIG. 2 is a flow chart of a method for preparing a phosphor-transition metal-photocatalyst hybrid composite material according to an embodiment of the present disclosure.

FIG. 2 is a flow chart schematically showing a method for preparing a phosphor-transition metal-photocatalyst hybrid composite material according to an embodiment of the present disclosure.

Referring to FIG. 2, a method for preparing the phosphor-transition metal-photocatalyst hybrid composite material according to an aspect of the present disclosure includes steps of (A) preparing phosphor beads, (B) allowing transition metal particles to be supported on the surfaces of the phosphor bead; and (C) coating a photocatalyst layer on the surface of each of the transition metal-supporting phosphor beads to form a photocatalyst layer.

The step (A) of preparing phosphor beads is performed by preparing a phosphor slurry and forming the phosphor beads using a silicone mold.

In an embodiment of the present disclosure, the step (A) of preparing phosphor beads may include preparing a phosphor slurry by mixing phosphor powder, a binder, zeolite, and distilled water, preparing semi-solid phosphor beads by injecting the phosphor slurry into a mold for manufacturing beads, followed by demolding, and preparing phosphor beads by drying and heat-treating the semi-solid phosphor beads.

The phosphor powder may include at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, (Sr, Ba)$_2$MgSi$_2$O$_7$:(Eu,Dy)-based, $Ba_4(Si_3O_8)_2$:(Eu,Dy)-based, and [Ca,Sr,Ba]—Al—O compound-based materials. In addition, the binder include at least one selected from sodium silicate ($Na_2SiO_3$) and glaze. In addition, the zeolite may be a powder raw material represented by a chemical formula ($W_mZ_nO_2)_n \cdot nH_2O$ (wherein W is Na, Ca, Ba or Sr, and Z=Si+Al).

For example, the phosphor beads may be prepared as follows. The phosphor powder ($Sr_4Al_{14}O_{25}$:$Eu^{2+}$,$Dy^{3+}$, etc.) and a mixture of the binder ($Na_2SiO_3$) and zeolite powder are pre-weighed at a weight ratio of 1:0.5 to 1 and the powder is mixed with distilled water and stirred to prepare a slurry. Then, the phosphor slurry is injected into a silicone mold having a diameter of about 3 mm, followed by demolding to prepare granular semi-solid phosphor beads in large quantities, and the phosphor beads are dried at room temperature and in an electric oven and heat-treated to prepare bulk strong light-emitting beads.

Meanwhile, despite the above descriptions, the method of preparing the phosphor slurry and the method of preparing beads thereof are not limited to the examples described above. Various other methods may also be applied thereto as long as the requirements for forming the phosphor beads are satisfied.

The step (B) of allowing the transition metal particles to be supported on the surfaces of the phosphor beads may be performed by preparing a transition metal mixture solution and applying the solution to the surfaces of the phosphor beads.

In an embodiment of the present disclosure, the step (B) of allowing the transition metal particles on the surfaces of the phosphor beads may include preparing a transition metal support solution by dissolving a transition metal salt in alcohol, adding the phosphor beads to the transition metal support solution, followed by sonication and filtration, and obtaining transition metal-supporting phosphor beads by drying and heat-treating the filtered phosphor beads.

In addition, the transition metal salt may include copper (II) nitrate trihydrate [$Cu(NO_3)_2 \cdot 3H_2O$] or copper (II) sulfate pentahydrate ($CuSO_4 \cdot 5H_2O$). In addition, a concentration of the transition metal support solution may be from 0.600 to 0.170 M, preferably, from 0.620 to 0.165 M. When this concentration range is satisfied, great effects on improving photocatalytic efficiency may be obtained.

For example, copper (II) nitrate trihydrate is dissolved in alcohol to prepare a solution having a concentration of 0.62 to 0.165 M, and phosphor beads are added to the solution, followed by sonication and filtration. The phosphor beads are dried at room temperature in an electric oven and heat-treated to prepare phosphor beads on which the transition metal is supported. Specifically, the dried beads may be heat-treated under a reducing atmosphere by injecting a nitrogen-hydrogen mixed gas thereinto.

The step (C) of coating the photocatalyst on the surface of the transition metal-supporting phosphor bead to form a photocatalyst layer may be performed by preparing a photocatalyst sol, applying the photocatalyst sol to the surfaces of the transition metal-supporting phosphor beads to form the photocatalyst layer, and performing heat treatment, thereby preparing the phosphor-transition metal-photocatalyst hybrid composite material.

The photocatalyst precursor may be a titanium precursor, and the titanium precursor may be, for example, titanium tetra-isopropoxide [Ti(OCH(CH$_3$)$_2$)$_4$], tetrabutyl titanate [Ti (C$_4$H$_9$O)$_4$], or tetraethoxytitanium [Ti(OCH$_2$CH$_3$)$_4$], preferably, titanium tetra-isopropoxide, without being limited thereto.

In an embodiment of the present disclosure, the step (C) of coating the photocatalyst on the surfaces of the transition metal-supporting phosphor beads to form the photocatalyst layer may be performed by applying at least one of a sol-gel method, hydrothermal synthesis, and chemical vapor deposition (CVD).

In an embodiment of the present disclosure, the step (C) of coating the photocatalyst on the surfaces of the transition metal-supporting phosphor beads to form the photocatalyst layer may include preparing a photocatalyst sol by mixing a photocatalyst precursor, an alcohol-based solution, and an acid, coating the photocatalyst on the surfaces of the transition metal-supporting phosphor beads by hydrothermal synthesis using the transition metal-supporting phosphor beads and the photocatalyst sol, and heat-treating the transition metal-supporting phosphor beads coated with the photocatalyst.

According to the hydrothermal synthesis, for example, titanium tetra-isopropoxide (TTIP, Ti(OCH(CH$_3$)$_2$)$_4$] as a titanium precursor, hydrous ethanol, an acid solution (HNO$_3$), and distilled water were mixed and stirred to prepare a titanium sol solution. The transition metal-supporting phosphor beads and the titanium sol solution were subjected to hydrothermal synthesis in an autoclave at a temperature of 110 to 200° C. to coat the transition metal-supporting phosphor beads with titanium dioxide. The reactor is naturally cooled and dried at room temperature to obtain the phosphor-transition metal-photocatalyst hybrid composite material.

Furthermore, in the case of coating titanium dioxide as the photocatalyst, the method may further include heat-treating the coated titanium dioxide at a temperature of 300 to 600° C. for 2 to 8 hours for crystallization into an anatase phase.

In addition, the photocatalyst sol may further include a tetraethyl orthosilicate solution. Adhesive strength between the phosphor and TiO$_2$ may be improved by adding an appropriate amount of the tetra-ethyl orthosilicate [Si (OC$_2$H$_5$)$_4$] solution together with the titanium precursor in the hydrothermal synthesis.

Meanwhile, a filter according to an aspect of the present disclosure includes an air-permeable body frame, and the phosphor-transition metal-photocatalyst hybrid composite material according to an embodiment of the present disclosure fixed to the body frame.

According to an embodiment, provided is a filter prepared by fixing a highly photo-active phosphor-transition metal-photocatalyst hybrid composite material to a metal mesh frame, wherein the hybrid composite material is prepared by coating the photocatalyst material on the surfaces of the phosphor beads that are manufactured using the phosphor powder and support the transition metal.

The phosphor-transition metal-photocatalyst hybrid composite material may be applied to metal mesh frames having various shapes to easily manufacture filters, and the filters may be applicable as filters for air purification due to high air-permeability thereof.

Hereinafter, the present disclosure will be described in more detail with reference to the following examples. However, the following examples are merely presented to exemplify the present disclosure, and the scope of the present disclosure is not limited thereto.

Example: Preparation of Phosphor-Transition Metal-Photocatalyst Filter

Figure 4A:
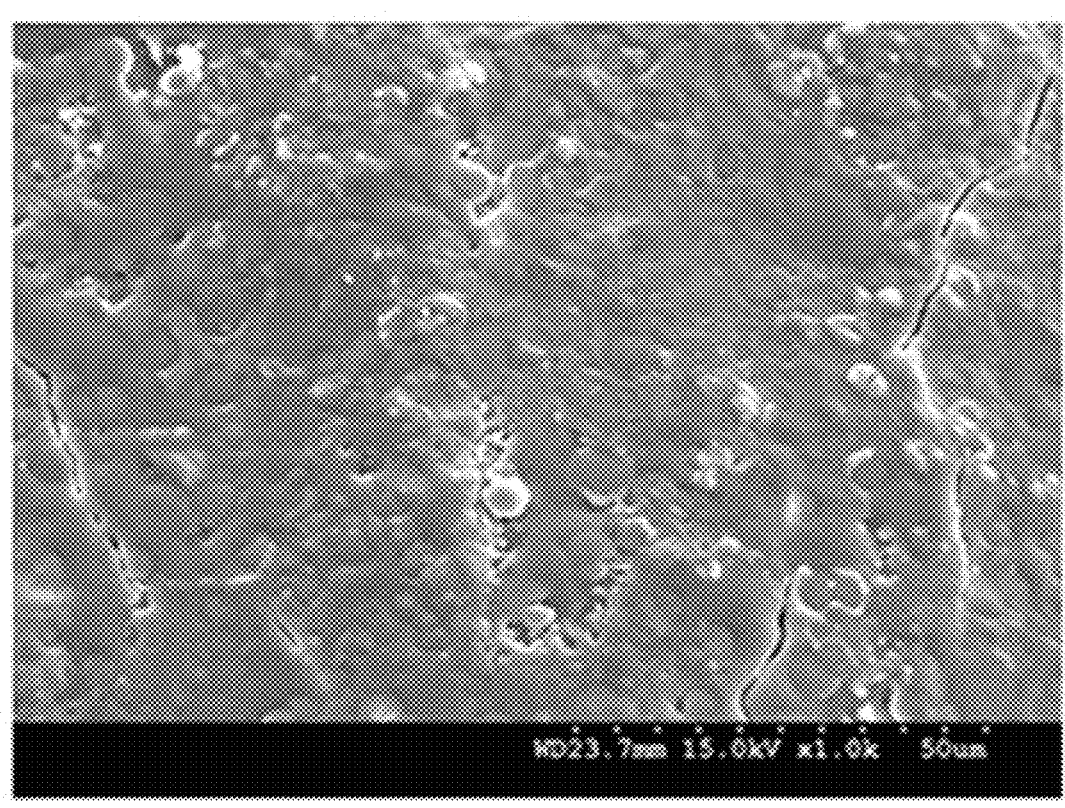
FIGS. 4A and 4B are scanning electron microscope (SEM) images of phosphor beads (scales: 50 μm and 5 μm).
Figure 4B:
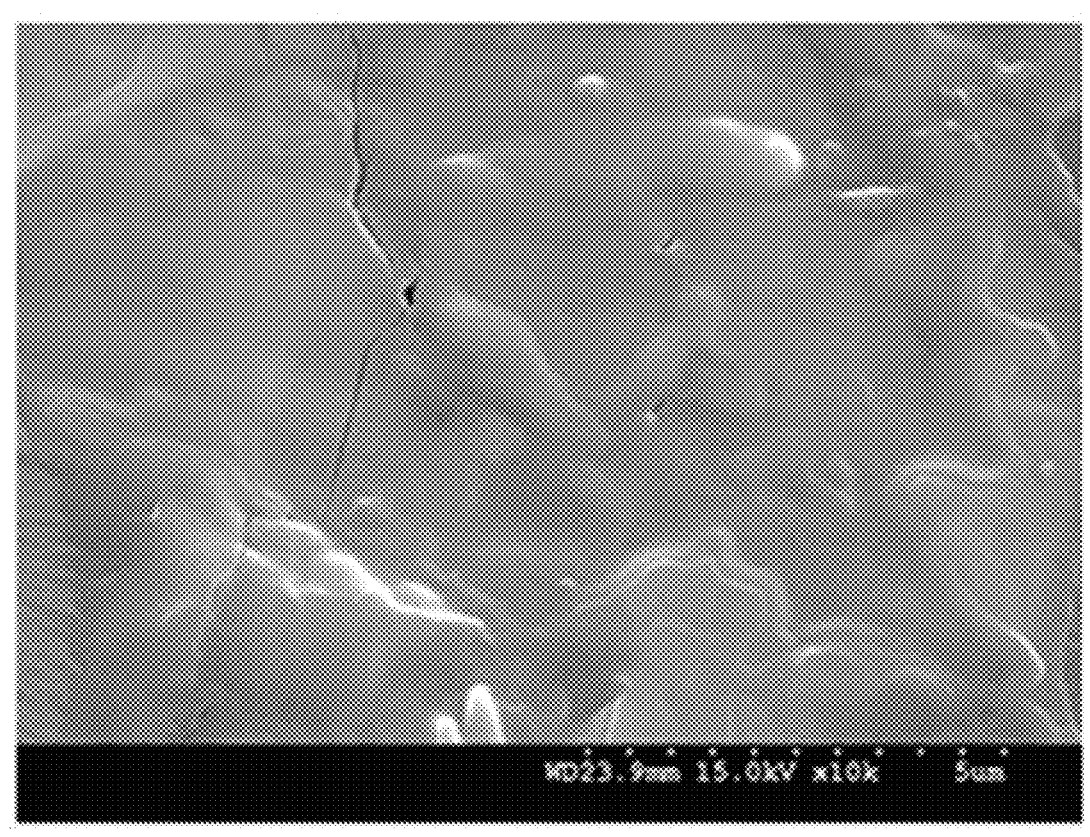

Sr$_4$Al$_{14}$O$_{25}$:Eu$^{2+}$,Dy$^{3+}$ powder as a phosphor and a mixture of Na$_2$SiO$_3$ as a binder and zeolite powder were pre-weighed at a weight ratio of 1:0.5 to 1 and mixed and stirred with distilled water to prepare a slurry. The phosphor slurry was injected into a silicone mold having a diameter of about 3 mm, followed by demolding to prepare granular semi-solid phosphor beads in large quantities. The semi-solid phosphor beads were dried at room temperature (at about 25° C., for 6 hours) and in an electric oven (at 100° C., for 2 hours), and then heat-treated in an electric furnace (at 350° C., for 3 hours) to prepare phosphor beads in the form of bulk hard light-emitting beads. FIG. 4A is an SEM image of a phosphor bead at 50 µm scale, and FIG. 4B is an SEM image at 5 µm scale.

Subsequently, copper (II) nitrate trihydrate was added to ethanol and stirred at 70° C. for 1 hour to prepare a copper solution having a concentration of 0.62 to 0.165 M. The phosphor beads prepared as described above were added to the copper solution, followed by sonication for 10 minutes and filtration. The resultant was dried at room temperature (at 25° C., for 3 hours) and in an electric oven (at 100° C., for 2 hours), and heat-treated in an electric furnace (under a 90% N$_2$-10% H$_2$ reducing atmosphere, at 300° C., for 2 hours) to prepare Cu-supporting phosphor beads.

Then, titanium tetra-isopropoxide (TTIP, Ti(OCH(CH$_3$)$_2$) $_4$] as a titanium precursor, hydrous ethanol, an acid solution (HNO$_3$), and distilled water were mixed at a volume ratio of 5:40:20:0.5 and stirred (at 50° C., for 2 hours) to prepare a titanium sol solution. The Cu-supporting phosphor beads and the titanium sol solution were added to a Teflon liner container and subjected to hydrothermal synthesis in an autoclave (at 130° C., for 4 hours) to coat the surfaces of the Cu-supporting phosphor beads with titanium dioxide. The reactor was naturally cooled at room temperature, and then the Cu-supporting phosphor-photocatalyst beads were collected and dried (at 100° C., for 2 hours). The coated titanium dioxide was crystallized into an anatase phase by heat treatment in an electric furnace (at 450° C., for 2 hours) to obtain a Cu-supporting phosphor-photocatalyst composite material.

Figure 4C:
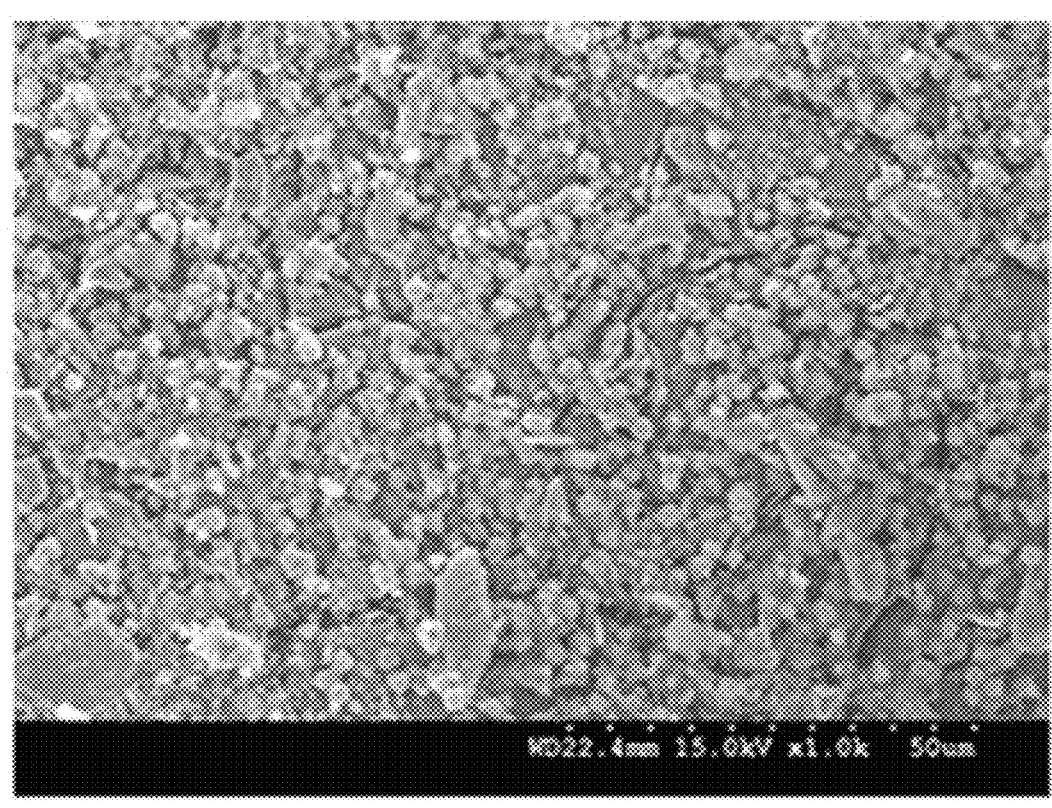
FIGS. 4C and 4D are SEM images of phosphor-transition metal-photocatalyst hybrid composite materials (scales: 50 μm and 5 μm).
Figure 4D:
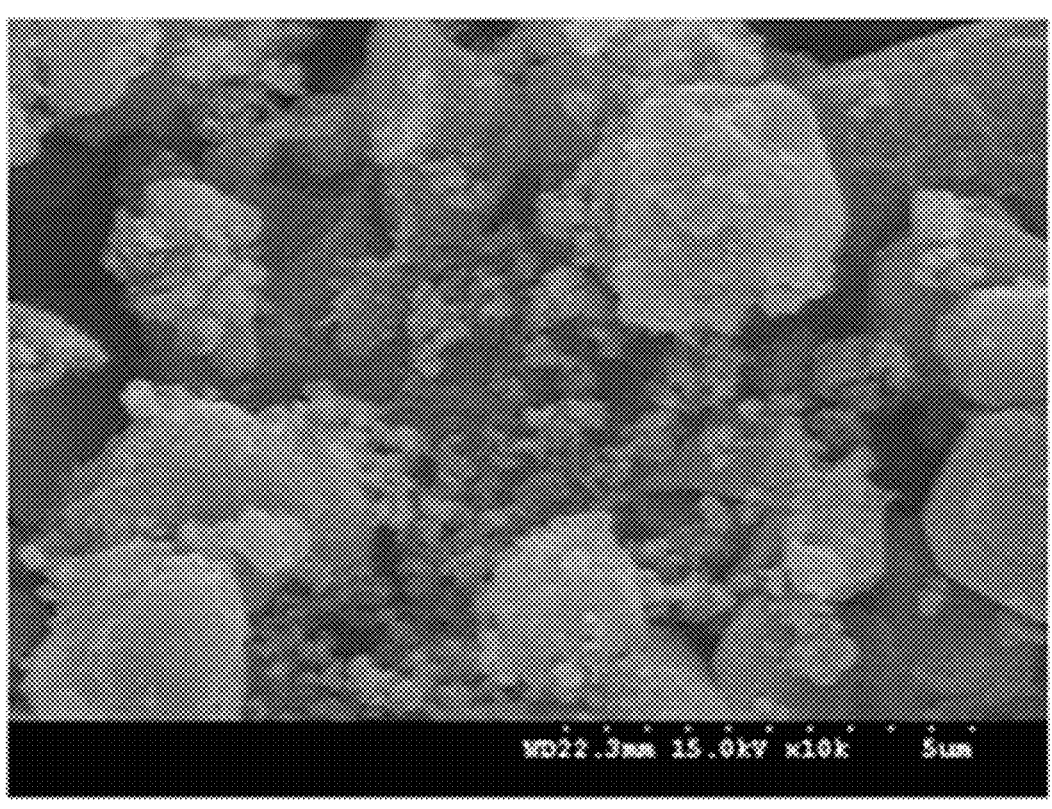
Figure 5:
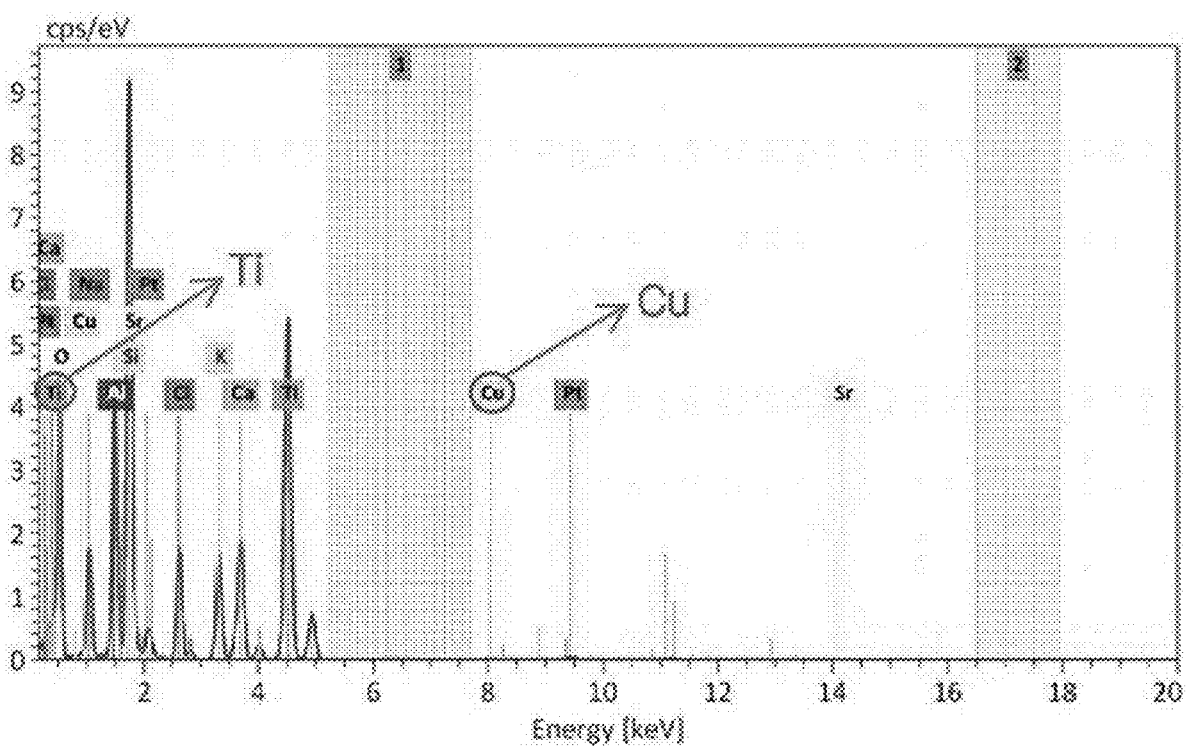
FIG. 5 shows ESD analysis results of a phosphor-transition metal-photocatalyst hybrid composite material.
Figure 6A:
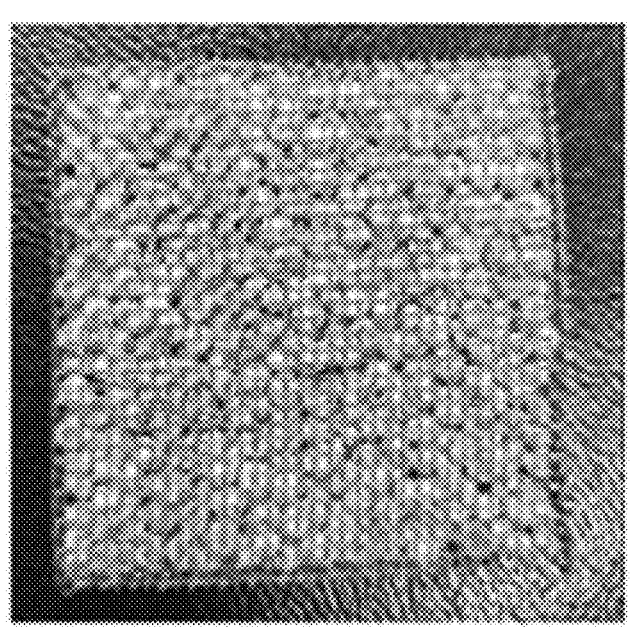
FIG. 6A is a top view of a filter using a phosphor-transition metal-photocatalyst hybrid composite material in a bright environment.
Figure 6B:
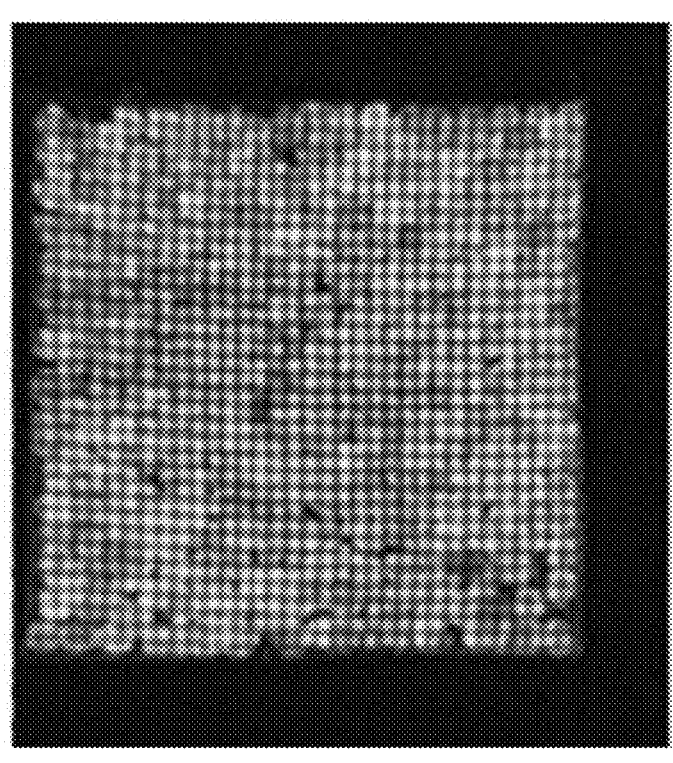
FIG. 6B is a top view of a filter using a phosphor-transition metal-photocatalyst hybrid composite material in a dark environment.
Figure 6C:
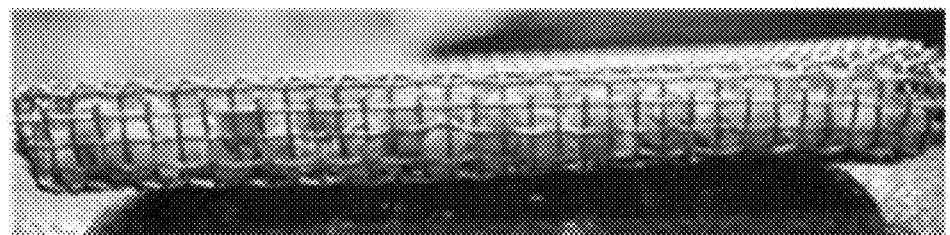
FIG. 6C is a side view of a filter using a phosphor-transition metal-photocatalyst hybrid composite material in a bright environment.
Figure 6D:
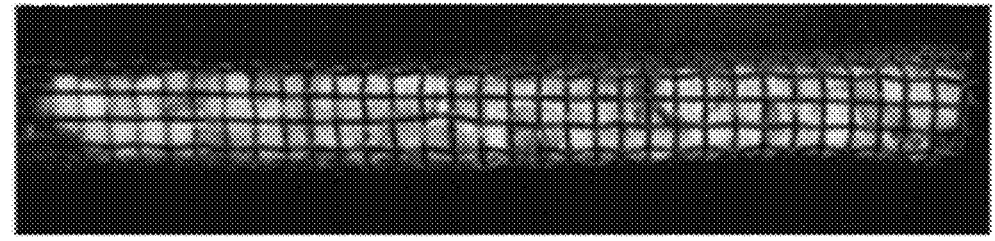
FIG. 6D is a side view of a filter using a phosphor-transition metal-photocatalyst hybrid composite material in a dark environment.

FIG. 4C is an SEM image of a Cu-supporting phosphor-photocatalyst composite material at 50 µm scale, and FIG. 4D is an SEM image of a Cu-supporting phosphor-photocatalyst composite material at 5 µm scale. It may be confirmed that Cu and TiO$_2$ particles are uniformly distributed on the surface of the phosphor bead. In addition, FIG. 5 shows ESD analysis results of a Cu-supporting phosphor-photocatalyst composite material, and Ti and Cu peaks may be identified.

In addition, a filter was prepared by applying the Cu-supporting phosphor-photocatalyst composite material to a metal mesh frame. FIGS. 6A to 6D are photographs (in a bright environment and a dark environment) of a phosphor-photocatalyst filter prepared by applying the Cu-supporting phosphor-photocatalyst composite material to a metal mesh frame having a 4.0 cm×4.0 cm×0.44 cm size, and it may be confirmed that light is uniformly emitted from the entire surface of the filter even in the dark environment after being exposed to light.

Experimental Example: Evaluation of Photolysis

A Cu-supporting phosphor-photocatalyst filter was prepared according to the above-described method, and an experiment on photolysis of toluene gas by the filter when the filter was exposed to visible light was conducted. As a light source, a 100 W-white light lamp having a wavelength of 410 nm or more and attached with an UV filter to block UV light and was used.

The photolysis experiment was performed in a measurement system equipped with a gas chromatography (GC) device used to analyse concentrations of toluene molecules.

A 1 L Teflon gas bag was used as a reaction chamber in which photolysis occurred. A phosphor-photocatalyst filter sample was placed on the bottom of the chamber and 10 ppm of toluene gas was injected thereinto. Changes in the concentration of toluene gas were identified by injecting gas, which was collected from the inside of the reaction chamber using a syringe, into the GC device and measuring the concentration thereof at each time during the progress of photolysis.

(1) Evaluation of Photolysis According to Photocatalyst Coating Method

Figure 7:
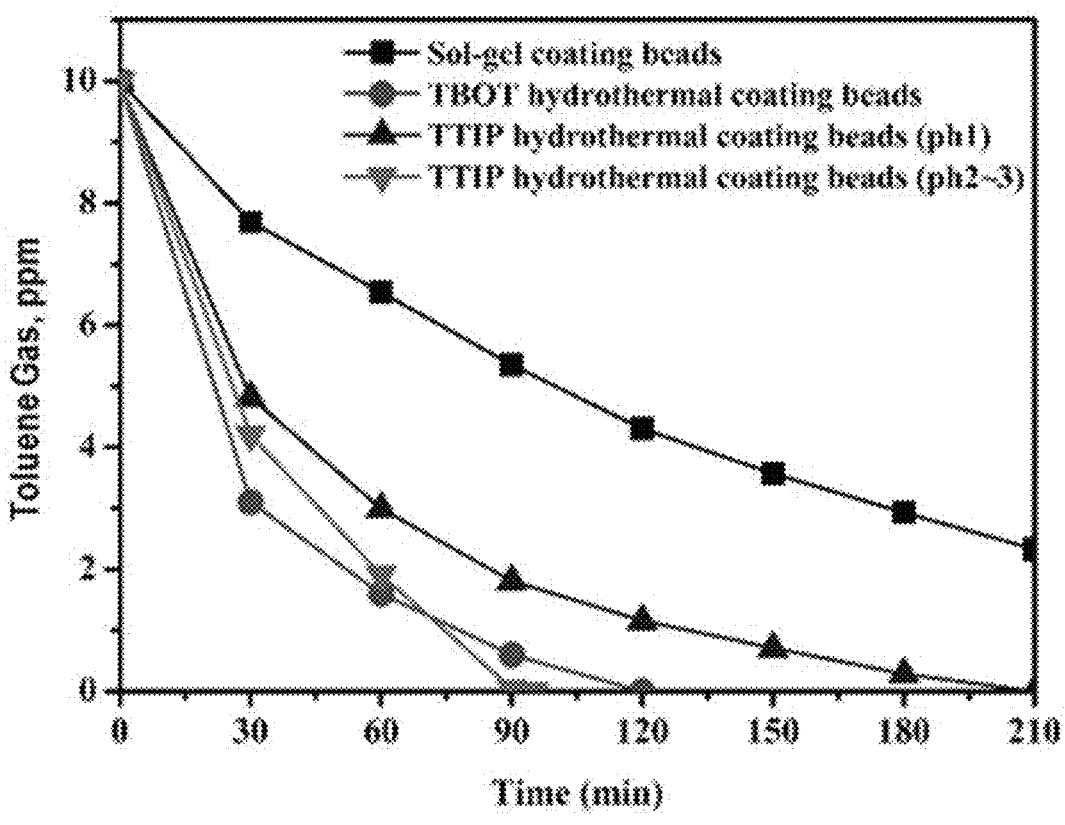
FIG. 7 is a graph showing toluene decomposition efficiency according to methods of coating a photocatalyst on phosphor beads (irradiation with visible light).

FIG. 7 is a graph showing comparison results of photolysis performance of the phosphor-photocatalyst on toluene gas between different coating methods, i.e., hydrothermal synthesis and a sol-gel method used to coat the photocatalyst material. In addition, difference in photolysis performance of the $Sr_4Al_{14}O_{25}:Eu^{2+},Dy^{3+}/TiO_2$ bead composite according to types of the titanium dioxide precursor as a raw material of the photocatalyst coating material and according to the pH levels.

Specifically, a $Sr_4Al_{14}O_{25}:Eu^{2+},Dy^{3+}/TiO_2$ composite material in which titanium dioxide was coated by the sol-gel method was prepared in Preparation Example 1 (■ of FIG. 7), a $Sr_4Al_{14}O_{25}:Eu^{2+},Dy^{3+}/TiO_2$ composite material in which titanium dioxide was coated by hydrothermal synthesis using titanium n-butoxide (TBOT) as a photocatalyst precursor was prepared in Preparation Example 2 (● of FIG. 7), a $Sr_4Al_{14}O_{25}:Eu^{2+},Dy^{3+}/TiO_2$ composite material in which titanium dioxide was coated by hydrothermal synthesis using titanium tetra-isopropoxide (TTIP) as a photocatalyst precursor at a pH level of 1 was prepared in Preparation Example 3 (▲ of FIG. 7), and a $Sr_4Al_{14}O_{25}:Eu^{2+},Dy^{3+}/TiO_2$ composite material in which titanium dioxide was coated by hydrothermal synthesis using TTIP as a photocatalyst precursor at a pH level of 2 to 3 was prepared in Preparation Example 4 (▼ of FIG. 7).

Referring to FIG. 7, photolysis rates of the materials in which titanium dioxide was coated by hydrothermal synthesis according to Preparation Examples 2 to 4 were higher than a photolysis rate of the material in which titanium dioxide was coated by the sol-gel method according to Preparation Example 1 (■ of FIG. 7). In addition, TTIP was the precursor having the highest reaction rate, and reaction rates significantly varied according to the pH level. The composite material in the form of beads had the best photolysis performance when the TTIP precursor was reacted at a pH level of 2 to 3.

(2) Evaluation of Photolysis According to Whether Transition Metal is Supported

Figure 8:
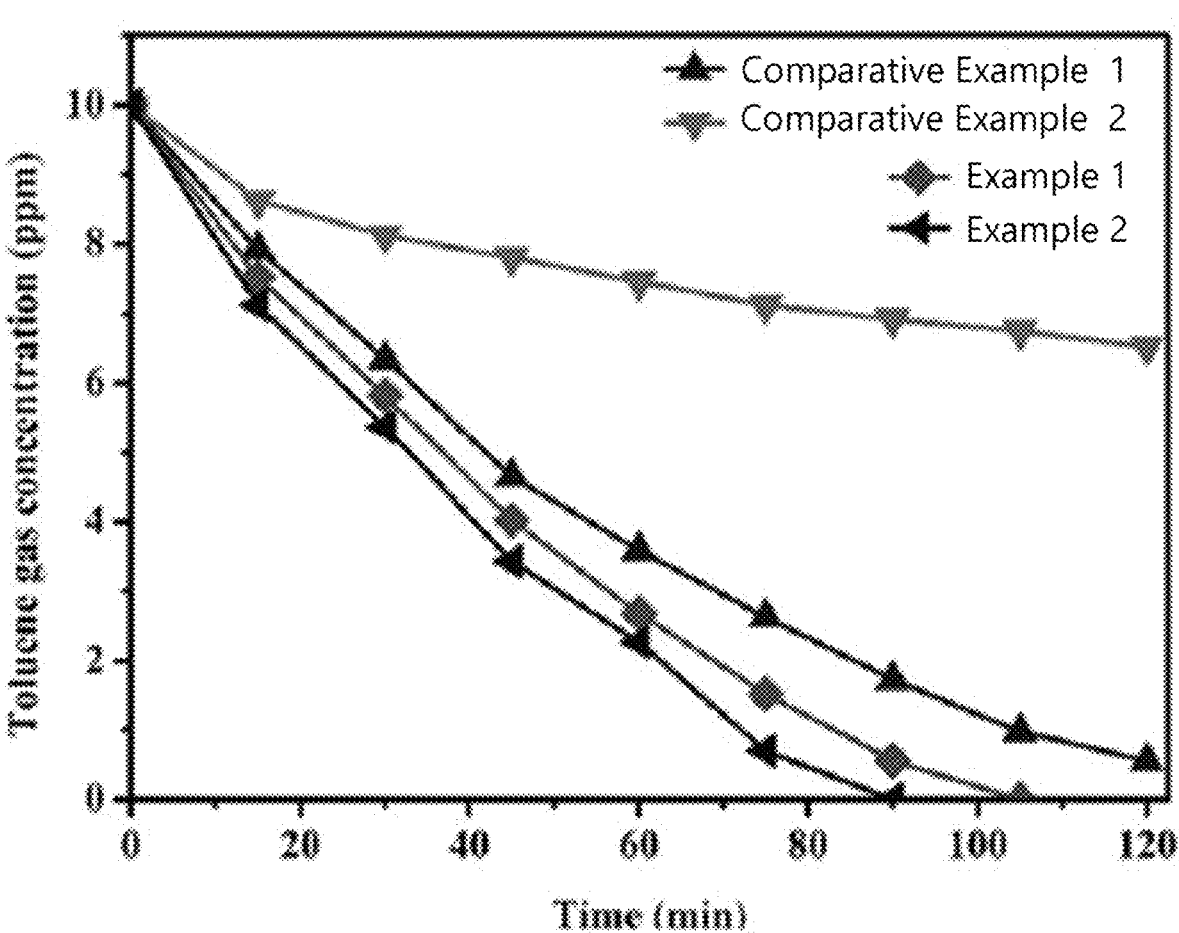
FIG. 8 is a graph showing toluene decomposition efficiency according to whether copper is supported before a photocatalyst is coated and according to the presence of $SiO_2$ (irradiation with visible light).

FIG. 8 is a graph showing comparison results of photolysis performance according to whether Cu is supported on the phosphor-photocatalyst and according to the concentration of the Cu support solution and comparison results of photolysis performance on toluene gas between a phosphor-photocatalyst bead sample obtained by hydrothermal synthesis using the TTIP precursor and a phosphor-photocatalyst bead sample further including $SiO_2$ to improve adhesive strength between the phosphor and $TiO_2$.

Specifically, in FIG. 8, $TiO_2$ was coated on the phosphor beads by hydrothermal synthesis using a TTIP precursor without supporting copper in Comparative Example 1 (▲ of FIG. 8), $TiO_2$ was coated together with $SiO_2$ on the phosphor beads by hydrothermal synthesis using the TTIP precursor without supporting copper in Comparative Example 2 (▼ of FIG. 8), copper was supported on the phosphor beads in a concentration of 0.062 M and then $TiO_2$ was coated together with $SiO_2$ on the phosphor beads by hydrothermal synthesis using the TTIP precursor (♦ of FIG. 8), and copper was supported on the phosphor beads in a concentration of 0.124 M and then $TiO_2$ was coated together with $SiO_2$ on the phosphor beads by hydrothermal synthesis using the TTIP precursor (◄ of FIG. 8).

Referring to FIG. 8, in the case where copper was not supported on the phosphor beads, the sample of Comparative Example 1 without using $SiO_2$ exhibited 90% or more of toluene gas removing efficiency after 120 minutes, and the sample of Comparative Example 2 in which $SiO_2$ was used to improve adhesive strength between the phosphor and $TiO_2$ exhibited a low level of toluene gas removing efficiency of about 35% after 120 minutes. On the contrary, in the case where copper was supported on the phosphor beads, 100% of toluene gas removing efficiency was obtained after 105 minutes (0.062 M Cu) and 90 minutes (0.124 M Cu) respectively in Examples 1 and 2 in which $SiO_2$ was added to improve adhesive strength between the phosphor and $TiO_2$. Based thereon, it was confirmed that the photolysis rate of toluene gas increased in the case where Cu was supported on the phosphor-photocatalyst beads, and the photolysis rate further increased as the concentration of Cu increased.

(3) Evaluation of Photolysis in Dark-Field

Figure 9:
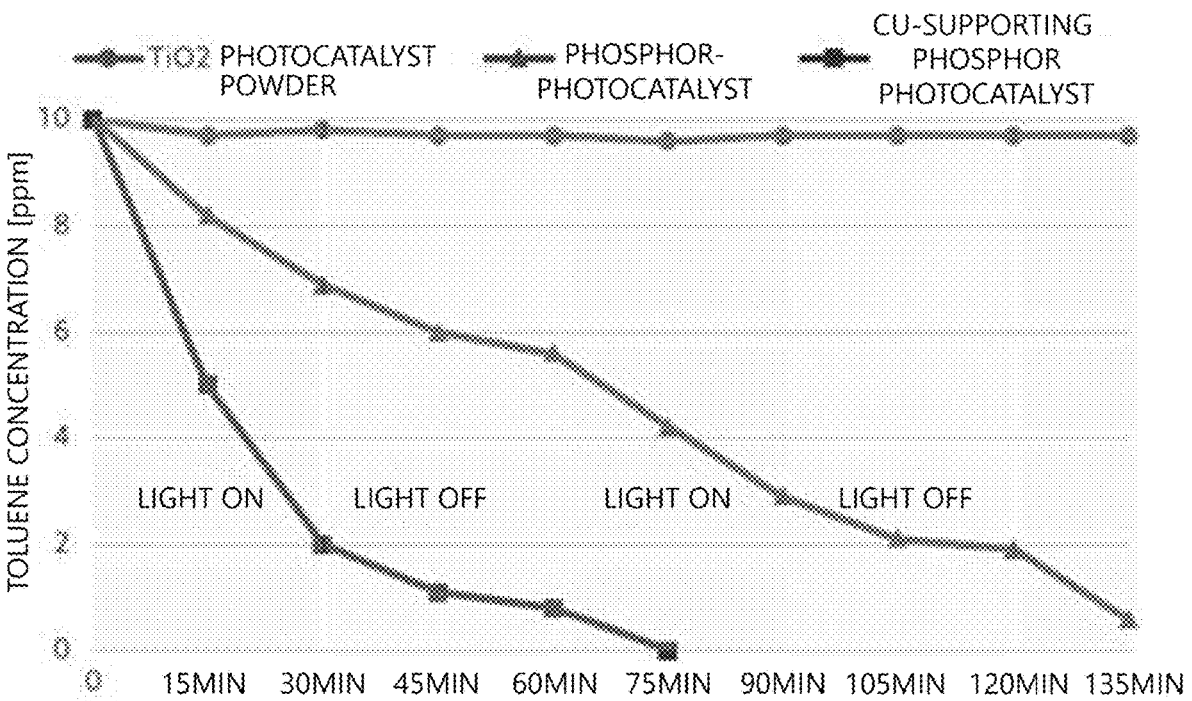
FIG. 9 is a graph showing toluene decomposition efficiency of a photocatalysts according to examples according to the present disclosure and comparative examples in a dark-field (irradiation with visible light).

FIG. 9 is a graph showing toluene gas photolysis rates of a Cu-supporting phosphor-photocatalyst filter sample according to the present disclosure (Example 3, ■ of FIG. 9), a phosphor-photocatalyst filter sample (no Cu) (Comparative Example 3, ▲ of FIG. 9), and a $TiO_2$ powder sample (Degussa, P-25) (Comparative Example 4, ● of FIG. 9) in a dark-field.

In this experiment, toluene gas photolysis of the samples of the examples and comparative examples was measured while being exposed to visible light for 30 minutes and then 30 minutes in a dark-field in which a light source is blocked after a switch of the light source was turned off (Light-off). Then, photolysis efficiency was represented as toluene concentration over time while repeating Light-on for 30 minutes and Light-off for 30 minutes.

Referring to FIG. 9, while 80% of toluene was removed while being exposed to the light source for initial 30 minutes in Example 3 due to vigorous photocatalytic reaction, 35% of toluene was removed in Comparative Example 3 because the photocatalytic reaction slowly occurred and photolysis rarely occurred in Comparative Example 4. Although the photocatalytic reaction occurred at similar levels in Example 3 and Comparative Example 3 in the dark-field after the light source was turned off (30 to 60 minutes), no reaction occurred in Comparative Example 4. When the light source was turned on again, all of toluene was removed within 75 minutes in total in Example 3, but 75% of toluene was removed at 90 minutes and up to 94% of toluene was removed at 135 minutes in Comparative Example 3 and no change was observed in Comparative Example 4.

It was confirmed that photolysis vigorously occurred by the phosphor-photocatalyst compared to conventional photocatalysts, and photolysis continued even in a dark-field and was significantly improved in the case where Cu was supported on the phosphor-photocatalyst according to the present disclosure. It is considered that photolysis in a dark-field occurred due to photo-activation of the photocatalyst material by light emitted from the phosphor material and photolysis efficiency increased due to Cu supported thereon in a bright-field. That is, based on the results of the photolysis experiment on toluene gas, it may be confirmed that in the Cu-supporting phosphor-photocatalyst filter according to the present disclosure, titanium dioxide is photo-activated not only by the light source but also light emitted from the phosphor material therein. Therefore, the Cu-supporting phosphor-photocatalyst filter according to the present disclosure has excellent photolysis effects even in a shady place or in a dark-field.

While the present disclosure has been particularly shown and described with reference to exemplary embodiments thereof, it will be understood by one of ordinary skill in the art that various changes in form and details may be made therein without departing from the spirit and scope of the present disclosure as defined by the following claims.

The invention claimed is:

1. A phosphor-transition metal-photocatalyst hybrid composite material comprising:
   a plurality of beads comprising a phosphor material, a binder, and zeolite;
   a plurality of transition metal particles supported on the surface of each of the plurality of beads; and a photocatalyst layer formed on the surface of each of the plurality of beads supporting the plurality of transition metal particles by coating a photocatalyst material.

2. The phosphor-transition metal-photocatalyst hybrid composite material according to claim 1, wherein the phosphor material comprises at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O compound-based materials.

3. The phosphor-transition metal-photocatalyst hybrid composite material according to claim 1, wherein the binder comprises at least one selected from sodium silicate $(Na_2SiO_3)$, sodium polyphosphate $(NaPO_3)_n$, liquid silica, and glaze.

4. The phosphor-transition metal-photocatalyst hybrid composite material according to claim 1, wherein the plurality of transition metal particles comprise particles of at least one selected from Cr, Mn, Fe, Co, Ni, Cu, Zn, Zr, Ru, Rh, Pd, Ag, Ta, W, Pt, and Au.

5. The phosphor-transition metal-photocatalyst hybrid composite material according to claim 1, wherein the photocatalyst material comprises titanium dioxide $(TiO_2)$, graphitic carbon nitride $(g-C_3N_4)$, or a material formed of a combination thereof.

6. The phosphor-transition metal-photocatalyst hybrid composite material according to claim 1, wherein the photocatalyst layer further comprises $SiO_2$.

7. A filter comprising:
   an air-permeable body frame; and
   the phosphor-transition metal-photocatalyst hybrid composite material according to claim 1 fixed to the body frame.

* * * * *